United States Patent Office

Re. 28,137
Reissued Aug. 27, 1974

28,137

OLEFIN PREPARATION

Leonard Turner, Woking, Christopher Patrick Cadman Bradshaw, Sunbury-on-Thames, and Eric James Howman, Crowthorne, England, by The British Petroleum Company Limited, London, England, assignee No Drawing. Original No. 3,526,676, dated Sept. 1, 1970, Ser. No. 507,675, Nov. 15, 1965. Application for reissue Mar. 1, 1972, Ser. No. 231,035
Claims priority, application Great Britain, Nov. 19, 1964, 47,053/64
Int. Cl. C07c *3/62, 15/10*
U.S. Cl. 260—683 D 16 Claims

Matter enclosed in heavy brackets [ ] appears in the original patent but forms no part of this reissue specification; matter printed in italics indicates the additions made by reissue.

ABSTRACT OF THE DISCLOSURE

A process for preparing olefins is provided which comprises reacting an initial mixture consisting essentially of two dissimilar acyclic olefins having the formulas $R(R_1)C{=}C(R_2)R_3$ and $R_4(R_5)C{=}C(R_6)R_7$ respectively, in the presence of an olefin disproportionation catalyst, the R substituents of the feed olefins representing hydrogen atoms or alkyl or aryl groups with the proviso that not more than two of the groupings $R(R_1)C<$, $$R_3(R)_2C<,$$

$R_4(R_5)C<$ or $R_7(R_6)C<$ are the same.

This invention relates to a process for the preparation of olefins.

It is known that the disproportionation of acyclic olefins into olefins having lower and higher carbon numbers than the feed olefin may be effected with certain catalysts e.g. a mixture of molybdenum and aluminium oxides preferably promoted with a cobalt oxide, or molydenum or tungsten hexacarbonyls supported on alumina, silica or silica-alumina. In our British Pat. No. 1,054,864 there is described the use of a catalyst comprising rhenium heptoxide and alumina to effect the disproportionation of acyclic olefins.

It has now been found that catalysts which effect the disproportionation of acyclic olefins having lower and higher carbon numbers than the feed olefin, such catalysts being hereinafter referred to as olefin disproportionation catalysts, will also promote a reaction between certain pairs of dissimilar acyclic olefins to give olefins of carbon number different from those of the reactant olefins. That a reaction between the two reactant olefins and not merely separate disproportionation of the olefins takes place is shown by the fact that the product distribution obtained differs considerably from that which would be expected by merely summing the products given by the separate disproportionation of each of the individual reactant olefins under analogous reaction conditions. That such a reaction is promoted by the specified catalysts not previously known or suspected since from the known disproportionation processes it would be expected that each individual reactant olefin would separately disproportionate and the product distribution obtanied would be merely the sum of the individual disproportionation products. There is no evidence from the known disproportionation processes which suggest that a true reaction between two dissimilar acyclic olefins would occur. It is known, however, that during disproportionation of acyclic olefins with the specified catalysts, double bond isomerisation may occur to a greater or lesser extent. However, nowhere has it been previously stated that the mixtures of double bond isomers formed thereafter inter-react under the reaction conditions.

Therefore according to the present invention there is provided a process for the preparation of olefins which comprises reacting an initial mixture of two dissimilar acyclic olefins having the formulae $R(R_1)C{=}C(R_2)R_3$ and $R_4(R_5)C{=}C(R_6)R_7$ respectively, in the presence of an olefin disproportionation catalyst, the R substiuents of the feed olefins representing hydrogen atoms or alkyl or aryl groups with the proviso that no more than 2 of the groupings $R(R_1)C<$, $R_3(R_2)C<$, $R_4(R_5)C<$ or $$R_7(R_6)C<$$

are the same. As stated above the product olefins have a carbon number different to those of the reactant olefins and the product distribution differs considerably from that expected from the separate disproportionation of each individual reactant olefin.

This new reaction which forms the subject of the present invention is a very general one from the point of view that any pair of specified olefins may be caused to react to produce other olefins. The product distribution obtained will depend primarily on the two starting olefins selected and to some extent on the reaction conditions employed. Thus, when two symmetrical dissimilar olefins are reacted, high selectivity to a single olefin product may be achieved. For example the reaction of ethylene and butene-2 may be effected with high selectivity to propylene. However, when at least one of the reactant olefins is asymmetric, a mixture of product olefins will always be obtained. For example ethylene and 4-methylpentene-2 may be reacted to give a mixture of 3-methylbutene-1 and propylene with high selectivity. From the foregoing it may be deduced that the primary products produced during the reaction are olefins having the formulae: $R(R_1)C{=}C(R_5)R_4$ and $R_3(R_2)C{=}C(R_6)R_7$ and/or $$R(R_1)C{=}C(R_6)R_7$$

and $R_3(R_2)C{=}C(R_6)R_4$. Such olefins may be produced by the process of the present invention with high selectivity.

On the other hand, since olefin disproportionation catalysts will in general also effect some degree of double bond isomerisation under certain reaction conditions, double bond isomerisation of the reactant olefins may occur causing the production of olefins having the formulae different from the primary products set out above and thus complicating the product distribution. However, since it is possible to reduce the isomerising activity of the catalyst by employing certain measures, some degree of control over the selectivity of the reaction may be exercised. Thus, in general lowering the reaction temperature and/or raising the feed rates of the initial olefins will reduce the amount of double bond isomerization taking place, particularly when using such catalysts as rhenium oxides on alumina. Catalyst such as mixtures of cobalt and molybdenum oxide on alumina may have their isomerization activity reduced by incorporating minor proportions of alkali metal or alkaline earth metal ions therein, and the use of such treated catalysts in the process of the invention gives rise to a higher selectivity to the above-mentioned primary products.

The two initial reactant olefins used as feeds to the present process have the formulae $R(R_1)C{=}C(R_2)R_3$ and $R_4(R_5)C{=}C(R_6)R_7$ where the R groups are hydrogen atoms or alkyl or aryl groups, preferably $C_{1-30}$, most preferably $C_1$ to $C_6$ alkyl groups, but not more than two of the groups $R(R_1)C<$, $R_3(R_2)C<$, $R_4(R_5)C<$ and $R_7(R_6)C<$ are the same. The olefins are acyclic but may be either straight-chain olefins or branched chain olefins. The position of the double bond in the reactant olefins is immaterial and may be in the 1-, 2-, 3- or others position. Examples of olefins from which the two initial reactants may be drawn include ethylene, propylene, butene-1, butene-2, pentene-1, pentene-2, 3-methylbutene-1, 4-methylpentene-2, hexene-1, hexene-2, hexene-3, and many others.

A particularly useful process is that in which ethylene is allowed to react over disproportionation catalysts with internal acyclic olefins which are thereby split into two 1-olefins. Because the ethylene is itself little affected by disproportionation catalysts it can be used in excess so that very high selectivities to 1-olefins may be obtained:

$$R(R_1)C{=}C(R_3)R_4 + C_2H_4 \rightarrow R(R_1)C{=}CH_2 + CH_2{=}C(R_3)R_4$$

Such a process is particularly valuable in obtaining useful 1-olefins from the less useful internal olefins.

The process may be carried out batchwise or in a continuous manner using the catalyst in the form of a fixed bed, a fluidised bed or a moving bed.

The conditions under which the process is carried out may vary depending on the particular catalyst used and the desired products. Using a catalyst such as rhenium oxide on alumina, the operating temperature may be in the range −20° C. to 500° C., temperatures in the range 20° C. to 100° C. being preferred. As the temperature decreases the selectivity of the reaction to the primary products mentioned above increases.

Catalysts such as cobalt oxide/molybdenum oxide on alumina, which may also contain minor amounts of alkali metal or alkaline earth metal ions, are generally used in the temperature range 80° C. to 280° C., again the lower temperatures within that range tending to provide higher selectivities to the primary products.

Reaction pressures may vary between 0 and 2000 p.s.i.g., and contact times may be generally in the range 0.01 second to 120 minutes, preferably in the range 0.1 second to 10 minutes.

Suitable olefin catalyst weight ratios are in the range 1000:1 to 1:1.

If desired, the process may be effected in the presence of an inert diluent e.g. paraffinic or cyclo-paraffinic hydrocarbons or in the presence of an inert carrier gas such as nitrogen.

The catalysts used in the present process are olefin disproportionation catalysts, that is to say catalysts which will effect the disproportionation of single acyclic olefins into olefins having a higher and lower carbon number than the said acyclic olefin. Catalysts which are known to effect such disproportionation and are therefore suitable for use in the present process are mixtures of molybdenum oxide and alumina preferably containing cobalt oxides and optionally containing minor amounts of alkali metal or alkaline earth metal ions; molybdenum or tungsten carbonyls supported on alumina, silica or silica/alumina; tungsten oxides supported on alumina; and rhenium heptoxide supported on alumina. All these catalysts are activated before use by subjecting them to a thermal treatment, either in a stream of inert gas such as nitrogen, carbon dioxide or helium, or preferably in a stream of air or oxygen followed by a final treatment in an inert gas. Suitably the catalysts are heated in air at a temperature in the range 300 to 900° C. for 1 minute to 20 hours and then under similar conditions in an inert gas such as nitrogen. A rhenium heptoxide catalyst preferably contains 0.1–40, most preferably 1–20 parts rhenium heptoxide per 100 parts alumina.

A very suitable rhenium heptoxide catalyst is described in our British Pat. No. 1,054,864.

A molybdenum oxide on alumina catalyst preferably contains 1 to 30 parts molybdenum oxide per 100 parts alumina.

A very suitable molybdenum oxide on alumina catalyst is described in British Pat. No. 1,056,980.

The present invention is illustrated by the following examples.

EXAMPLE 1

A catalyst containing 14% by weight $MoO_3$ and 2.5% by weight CoO on alumina was activated by heating in a stream of dry air at 570° C. for 1 hour followed by dry nitrogen at 570° C. for 1½ hours.

(a) A mixture of cis-butene-2 and nitrogen was passed over the activated catalyst at gas hourly space velocities of 600 v./v. and 1200 v./v. respectively, at atmospheric pressure and at 180° C. for 10 minutes. The products obtained are set out below.

| | Feed percent mole | Product percent mole |
|---|---|---|
| $N_2$ | 66.7 | 66.7 |
| $C_2H_4$ | | Trace |
| $C_3H_6$ | | 6.1 |
| $C_4H_8$ | 33.3 | 22.5 |
| $C_5H_{10}$ | | 4.1 |
| $C_6H_{12}$ | | 0.6 |

(b) The above experiment was repeated using a mixture of ethylene and nitrogen at GHSV's of 1200 v./v. and 600 v./v. respectively. The products obtained are set out below.

| | Feed percent mole | Product percent mole |
|---|---|---|
| $N_2$ | 33.3 | 33.3 |
| $C_2H_4$ | 66.7 | 66.9 |
| $C_3H_6$ | | 0.6 |
| $C_4H_8$ | | 0.2 |

(c) An experiment illustrating the present process was carried out under the same conditions as experiments (a) and (b) using a combined feed of cis-butene-2 and ethylene at GHSV's of 600 v./v. and 1200 v./v. respectively. The products obtained are set out below together with the combined products expected from disproportionation of the individual olefins.

| | Feed percent mole | Product percent mode | Combined products expected from disproportionation of the individual olefins, percent mole. |
|---|---|---|---|
| $C_2H_4$ | 66.7 | 54.3 | 65.9 |
| $C_3H_6$ | | 24.6 | 6.7 |
| $C_4H_8$ | 33.3 | 19.9 | 22.7 |
| $C_5H_{10}$ | | 1.2 | 4.1 |
| $C_6H_{12}$ | | | 0.6 |

It is clearly seen that a true reaction has taken place between the ethylene and cis-butene-2 with a high selectivity to propylene. Roughly equimolar amounts of the reactant olefins were consumed and the selectivity to propylene is 90% molar (93% by weight).

EXAMPLE 2

A catalyst was prepared by slurrying ammonium perrhenate and alumina with water and evaporating to dryness at 100° C., the quantities being chosen to give a product containing 20 percent by weight of rhenium heptoxide calculated as $Re_2O_7$. It was activated in dry air (GHSV 1000) at 570° C. for 1 hour, then in a similar flow of dry nitrogen at 570° C. for 1.5 hours.

Cis-butene-2 and ethylene, each at a GHSV of 1000 were mixed and allowed to pass over the catalyst at atmospheric pressure and 140° C. for a period of 30 minutes. The products obtained are set out below.

| | Feed percent mole | Product percent mole |
|---|---|---|
| $C_2H_4$ | 50 | 20.5 |
| $C_3H_6$ | | 54.4 |
| $C_4H_{8-1}$ | | 2.1 |
| $C_4H_{8-2}$ | 50 | 21.3 |
| $C_5H_{10}$ | | 1.7 |

At a conversion of 53% based on $C_4H_8$ feed, there was a selectivity to propylene of 97%.

EXAMPLE 3

The catalyst described with reference to Example 2 was activated by heating in dry air at GHSV of 2000 at 580° C. for 1 hour and then in a similar flow of dry nitrogen for 1.5 hours.

A mixture of 4-methylpentene-2 (96.6% plus 3.4% other $C_6$ olefins) at a GHSV of 250 and ethylene (96.5% plus 3.5% ethane) at a GHSV of 1000 was passed at 40° C. and atmospheric pressure over the catalyst. The composition of the feed and products are set out below.

| | Feed percent mole | Products percent mole |
|---|---|---|
| $C_2H_4$ | 77.2 | 60.3 |
| $C_2H_6$ | 2.8 | 2.8 |
| $C_3H_6$ | | 18.8 |
| $C_4H_8$ | | 1.0 |
| 3MB1 | | 14.7 |
| 4MP2 | 19.3 | 1.1 |
| Other C6's | 0.7 | 0.5 |
| $C_7H_{14}$ | | 0.8 |
| $C_8H_{16}$ | | Trace |

At a conversion of 93.6% based on 4-methylpentene-2 there was a selectivity to 3-methylbutene-1 and propylene of 92.9%.

EXAMPLE 4

A mixture of ethylene at a GHSV of 450 and butene-2 at a GHSV of 550 was passed at 25° C. and atmospheric pressure over a catalyst prepared and activated as described in Example 2. The composition of the feed and products are set out below.

| | Feed percent mole | Product percent mole |
|---|---|---|
| $C_2H_4$ | 45 | 15.6 |
| $C_3H_6$ | 0 | 59.6 |
| $C_4H_{8-1}$ | 0.07 | 0.06 |
| $C_4H_{8-2}$ | 54.3 | 24.5 |
| Iso-$C_4H_8$ | 0.03 | 0.14 |
| $C_5H_{10}$ | 0.05 | 0.10 |

At a conversion of 54.9% based on butene-2 there was a selectivity to propylene of 99.7%.

EXAMPLE 5

A mixture of butene-1 at a GHSV of 1000 and butene-2 at a GHSV of 4000 was passed at 25° C. and atmospheric pressure over a catalyst prepared and activated as described in Example 1. The compositions of the feed and products obtained are set out below.

| | Feed percent mole | Product percent mole |
|---|---|---|
| $C_2H_4$ | 0 | 0.2 |
| $C_3H_6$ | 0 | 18.8 |
| $C_4H_{8-1}$ | 20 | 2.2 |
| $C_4H_{8-2}$ | 80 | 61.5 |
| $C_5H_{10}$ | 0 | 16.0 |
| $C_6H_{12}$ | 0 | 1.3 |

Whereas the disproportionation of butene-1 alone is known to give almost exclusively ethylene and hexenes, in the present experiment the butene-1/butene-2 mixture yields of butene-1 being suppressed in favour of the butene-1, butene-2 reaction to give propylene and pentenes,

We claim:

[1. A method of producing acyclic 1-olefins consisting essentially of reacting an acyclic internal olefin having the olefin group in other than the 1-position with ethylene in the presence of an olefin disproportionation catalyst.

[2. A method as in claim 1 wherein ethylene and butene-2 are reacted to form propylene in the presence of an olefin disproportionation catalyst.]

[3. A method as in claim 1 wherein ethylene and 4-methylpentene-2 are reacted to form 3-methylpentene-1 and propylene in the presence of an olefin disproportionation catalyst.]

[4. A method of reacting two dissimilar symmetrical acyclic olefins in the presence of a disproportionation catalyst and obtaining as the primary reaction product a single acyclic olefin different from each of the starting olefins.]

[5. A method of producing 1-olefins of the formula $R(R_1)C{=}CH_2$ and $CH_2{=}C(R_3)R_4$ consisting essentially of reacting ethylene in the presence of an olefin disproportionation catalyst with an internal olefin of the formula $R(R_1)C{=}C(R_3)R_4$ wherein the R groups are hydrogen atoms or alkyl or aryl groups having up to 30 carbon atoms, the R groups being further selected so that the olefinic bond in the internal olefin is an internal bond.]

[6. A method as in claim 5 wherein the catalyst comprises rhenium heptoxide.]

[7. A method as in claim 5 wherein the R groups are hydrogen atoms or alkyl groups having up to 6 carbon atoms.]

8. A process for the preparation of olefins consisting of reacting two dissimilar olefins having the formulas $R(R_1)C{=}C(R_2)R_3$ and $R_4(R_5)C{=}C(R_6)R_7$ respectively with each other in the presence of a rhenium oxide-alumina disproportionation catalyst, the R substituents of the feed olefins representing hydrogen atoms or alkyl or aryl groups having up to 30 carbon atoms, not more than two of the groupings $R(R_1)C<$, $R_3(R_2)C<$, $R_4(R_5)C<$ or $R_7(R_6)C<$ being the same, and obtaining a reaction mixture different from the sum of the individual reaction mixtures that would be obtained by separately disproportionating each of the starting olefins under the same conditions.

9. A process according to claim 8 wherein the R groups are hydrogen atoms or $C_{1-6}$ alkyl groups.

10. A process according to claim 8 wherein one of the olefins is ethylene.

11. A process according to claim 8 wherein the catalyst contains 0.1–40 parts rhenium heptoxide per 100 parts alumina.

12. A process according to claim 8 wherein disproportionation is effected at a temperature in the range −20° C. to +500° C.

13. A process according to claim 12 wherein disproportionation is effected at a temperature in the range 20° C. to 100° C.

14. A process according to claim 8 wherein the reaction pressure is in the range 0 to 2000 p.s.i.g.

15. A process according to claim 8 wherein the reaction time lies between 0.01 second and 120 minutes.

16. A process according to claim 15 wherein the reaction time lies between 0.1 second and 10 minutes.

17. A process according to claim 8 wherein the olefin/catalyst weight ratio is in the range 1000:1 to 1:1.

*18. A process for the preparation of olefins consisting of reacting two dissimilar olefins having the formulas*

$$R(R_1)C{=}C(R_2)R_3 \text{ and } R_4(R_5)C{=}C(R_6)R_7$$

*respectively with each other in the presence of a rhenium heptoxide-alumina disproportionation catalyst, the R substituents of the feed olefins representing hydrogen atoms or alkyl or aryl groups having up to 30 carbon atoms, not more than two of the groupings*

$$R(R_1)C<,\ R_3(R_2)C<,\ R_4(R_5)C< \text{ or } R_7(R_6)C<$$

*being the same, and obtaining a reaction mixture different from the sum of the individual reaction mixtures that would be obtained by separately disproportionating each of the starting olefins under the same conditions.*

*19. A process for the preparation of olefins consisting of reacting two dissimilar butenes with each other in the presence of a rhenium heptoxide-alumina disproportionation catalyst and obtaining a reaction mixture different from the sum of the individual reaction mixtures that would be obtained by separately disproportionating each of the butenes under the same conditions.*

*20. A process as defined in Claim 19 wherein the dissimilar butenes are butene 1 and butene 2.*

*21. A method of producing acylic 1-olefins consisting essentially of reacting an acyclic internal olefin having the olefin group in other than the 1-position with ethylene in the presence of a rhenium heptoxide disproportionation catalyst.*

*22. A method of producing 3-methylpentene-1 and propylene consisting essentially of reacting ethylene and 4-methylpentene-2 in the presence of an olefin disproportionation catalyst.*

*23. A method of producing 1-olefins of the formula*

$$R(R_1)C{=}CH_2 \text{ and } CH_2{=}C(R_3)R_4$$

*consisting essentially of reacting ethylene in the presence of an olefin disproportionation catalyst comprising rhenium heptoxide with an internal olefin of the formula* $R(R_1)C{=}C(R_3)R_4$ *wherein the R groups are hydrogen atoms or alkyl or aryl groups having up to 30 carbon atoms, the R groups being further selected so that the olefinic bond in the internal olefin is an internal bond.*

References Cited

The following references, cited by the Examiner, are of record in the patented file of this patent or the original patent.

UNITED STATES PATENTS

| | | | |
|---|---|---|---|
| 2,196,363 | 4/1940 | Robertson | 260—683 |
| 2,614,137 | 10/1952 | Chenicek | 260—683.15 |
| 3,261,879 | 7/1966 | Banks | 260—683 |
| 3,296,330 | 1/1967 | Sherk | 260—683 |

OTHER REFERENCES

Banks et al., I. & E. C. *Product Research* and *Development Journal,* Vol. 3, pp. 170–173, September 1964.

DELBERT E. GANTZ, Primary Examiner

C. F. SPRESSER, Jr., Assistant Examiner

U.S. Cl. X.R.

260—669 R, 677 R, 683.2